US008463450B2

(12) United States Patent
Martin

(10) Patent No.: US 8,463,450 B2
(45) Date of Patent: Jun. 11, 2013

(54) AGGREGATED MANAGEMENT SYSTEM

(75) Inventor: Alastair Martin, Edinburgh (GB)

(73) Assignee: Flexitricity Limited, Edinburgh Lothian (GB)

( * ) Notice: Subject to any disclaimer, the term of this patent is extended or adjusted under 35 U.S.C. 154(b) by 748 days.

(21) Appl. No.: 12/374,197

(22) PCT Filed: Jun. 21, 2007

(86) PCT No.: PCT/GB2007/050347
§ 371 (c)(1),
(2), (4) Date: Sep. 22, 2009

(87) PCT Pub. No.: WO2008/009986
PCT Pub. Date: Jan. 24, 2008

(65) Prior Publication Data
US 2010/0049371 A1   Feb. 25, 2010

(30) Foreign Application Priority Data

Jul. 18, 2006 (GB) .................................. 0614193.1

(51) Int. Cl.
*G05D 3/12* (2006.01)
*G06F 11/30* (2006.01)

(52) U.S. Cl.
USPC ........... 700/291; 700/286; 700/293; 700/295; 702/182; 702/183; 702/184

(58) Field of Classification Search
USPC .................. 700/293, 286, 295, 291; 397/11, 397/29, 32, 34, 154; 702/182–185
See application file for complete search history.

(56) References Cited

U.S. PATENT DOCUMENTS

| | | | | |
|---|---|---|---|---|
| 3,849,637 A | * | 11/1974 | Caruso et al. ................. | 700/287 |
| 4,489,386 A | * | 12/1984 | Breddan ....................... | 700/291 |
| 4,583,182 A | * | 4/1986 | Breddan ....................... | 700/291 |
| 5,274,571 A | * | 12/1993 | Hesse et al. ................... | 700/291 |
| 5,315,533 A | * | 5/1994 | Stich et al. .................... | 700/298 |
| 5,502,339 A | | 3/1996 | Hartig | |
| 5,572,438 A | * | 11/1996 | Ehlers et al. .................. | 700/295 |

(Continued)

FOREIGN PATENT DOCUMENTS

| | | |
|---|---|---|
| EP | 1255340 A1 | 11/2002 |
| GB | 2 361 118 A | 10/2001 |

(Continued)

OTHER PUBLICATIONS

Wang-K., The DER Revoltion and Right-Sizing Energy Resources, IEEE, 2006, 2pages.*

(Continued)

*Primary Examiner* — Kavita Padmanabhan
*Assistant Examiner* — Thomas Stevens
(74) *Attorney, Agent, or Firm* — Foley & Lardner LLP; John D. Lanza

(57) ABSTRACT

An aggregated management system for managing a commodity, such as electricity or gas, is disclosed. The system includes: a plurality of commodity resources; an availability calculator; a resource aggregator, wherein each resource, depending on availability data from the availability calculator, is aggregated to represent an aggregated resource; a resource controller, wherein each commodity resource, depending on availability, is selectively operated by the resource controller in response to a resource instruction; and an interlace to provide information regarding the aggregated resource and receive resource instructions regarding the aggregated resource for the resource controller.

14 Claims, 2 Drawing Sheets

U.S. PATENT DOCUMENTS

| | | | | |
|---|---|---|---|---|
| 5,684,710 A * | 11/1997 | Ehlers et al. | | 700/293 |
| 5,706,207 A * | 1/1998 | Kurten et al. | | 700/286 |
| 5,952,733 A * | 9/1999 | Johnston | | 307/44 |
| 5,963,457 A * | 10/1999 | Kanoi et al. | | 700/291 |
| 6,107,691 A * | 8/2000 | Gore et al. | | 290/1 R |
| 6,392,856 B1 * | 5/2002 | Kehrli et al. | | 361/64 |
| 6,519,509 B1 | 2/2003 | Nierlich et al. | | |
| 6,633,799 B2 * | 10/2003 | Krakovich et al. | | 700/286 |
| 7,035,065 B2 * | 4/2006 | McNally et al. | | 361/42 |
| 7,135,956 B2 * | 11/2006 | Bartone et al. | | 340/3.9 |
| 7,177,728 B2 * | 2/2007 | Gardner | | 700/295 |
| 7,249,043 B1 * | 7/2007 | Trout et al. | | 705/7.25 |
| 7,274,975 B2 * | 9/2007 | Miller | | 700/295 |
| 7,680,561 B2 * | 3/2010 | Rodgers et al. | | 700/295 |
| 2001/0010032 A1 * | 7/2001 | Ehlers et al. | | 702/62 |
| 2002/0072868 A1 | 6/2002 | Bartone et al. | | |
| 2003/0041037 A1 | 2/2003 | Spool et al. | | |
| 2003/0041038 A1 | 2/2003 | Spool et al. | | |
| 2003/0144864 A1 | 7/2003 | Mazzarella | | |
| 2003/0236593 A1 | 12/2003 | Schumacher | | |
| 2004/0024483 A1 * | 2/2004 | Holcombe | | 700/122 |
| 2004/0078153 A1 | 4/2004 | Bartone et al. | | |
| 2004/0138787 A1 | 7/2004 | Ransom et al. | | |
| 2004/0193329 A1 | 9/2004 | Ransom et al. | | |
| 2005/0116814 A1 * | 6/2005 | Rodgers et al. | | 340/310.01 |
| 2005/0131583 A1 | 6/2005 | Ransom | | |
| 2005/0143865 A1 * | 6/2005 | Gardner | | 700/291 |
| 2005/0201028 A1 | 9/2005 | Inami et al. | | |
| 2007/0100506 A1 * | 5/2007 | Teichmann | | 700/297 |
| 2007/0210582 A1 * | 9/2007 | Bernardi et al. | | 290/46 |
| 2007/0213880 A1 * | 9/2007 | Ehlers | | 700/295 |

FOREIGN PATENT DOCUMENTS

| | | |
|---|---|---|
| GB | 2 407 440 A | 4/2005 |
| GB | 2 407 927 A | 5/2005 |
| GB | 2 416 047 A | 1/2006 |
| WO | WO-02/069471 A1 | 9/2002 |
| WO | WO-03/084023 A1 | 10/2003 |
| WO | WO-2004/053764 A1 | 6/2004 |
| WO | WO-2004/068672 A1 | 8/2004 |

OTHER PUBLICATIONS

Martin-A., "Investigating Home Automation" Final Year Disseration: COM3021 Department of Computer Science Sheffiled University, 2003, 57pages.*

Molderink et al., "Simulating the Effects on the Energy Efficiency of Smart Grid Technologies", Aug. 2009, pp. 1530-1541.*

Lopes et al., "Integrating Distributed Generation inot Electric Power Systems: A Review of Drivers, Challenges and Opportunities", 2006, Science Direct, p. 1189-1203.*

International Search Report for PCT/GB2007/050347, mailed on May 2, 2008, pp. 2.

Written Opinion for PCT/GB2007/050347, mailed on May 2, 2008, pp. 5.

International Preliminary Report on Patentability, mailed on Jan. 20, 2009, pp. 6.

"Activities Controlling Supply Reliability" retrieved on May 12, 2008 from http://www.steag.saarenergie.de/en/02_Leistungen/07.php (1 page).

"First Point EIS-Overview" Author Uknown, retrieved on Jun. 3, 2009 from Jun. 3, 2009 from http://web.archive.org/20060311202528/http://www.firstpoint.com/aspx/services/eis_overview.aspx. (2 pages).

"Technical Specification" Author unknown, retrieved on Jun. 3, 2009 from http://web.archive.org/web/20060615060747/http://eloquent.com/products/agora/tech_specs.html (2 pages).

"Virtual Power Plant" Author Unknown, retrieved on Jun. 3, 2009 from http://web.archive.org/20071022140244/http://www.encorp.com/content.asp56.htm (2 pages).

Schulz, C. et al. "Virtual power plants with combined heat and power micro units", 2005 International Conference on Nov. 16-18, 2005 (5 pages).

* cited by examiner

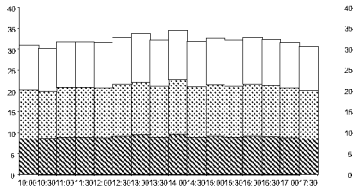  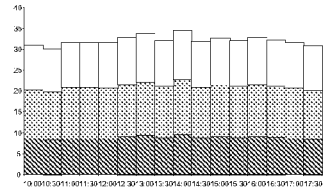
Fig. 2a      Fig. 2b      Fig. 2c
Fig. 3
Fig. 4a      Fig. 4b      Fig. 4c
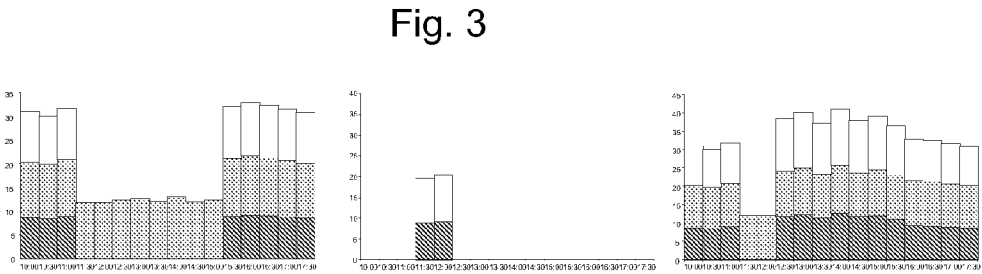
Fig. 5

AGGREGATED MANAGEMENT SYSTEM

The present invention relates to an aggregated management system and particularly, but not exclusively, to an aggregated management system for a commodity, such as electricity or gas.

Currently, most electricity in the UK is generated by large nuclear, coal and gas power stations. Electricity supply and demand must remain in balance at all times, and the Transmission System Operator, currently National Grid, is charged with this responsibility by the gas and electricity regulator, OFGEM. National Grid passes a large fraction of this responsibility on to individual licensed electricity generators and suppliers via the balancing mechanism ("BM").

Licensed generators and suppliers are permitted to trade with each other and with third parties in order to balance supply and demand within their own portfolios, up to a time known as "gate closure", currently one to one and a half hours ahead of real time, when all trades are frozen and any residual balancing required is undertaken by National Grid. The BM is a means of allowing National Grid access to medium to large power stations for this residual balancing.

System frequency is a continuously changing variable that is determined and controlled by the balance between system demand and total generation. If demand is greater than generation, the frequency falls, while if generation is greater than demand, the frequency rises. National Grid has a statutory obligation to maintain system frequency within 1% of 50 Hz.

National Grid must therefore ensure that sufficient generation and/or demand is held in automatic readiness to manage all credible frequency change contingencies. The second-by-second system frequency control is managed through the automatic actions of generators and suppliers. Minute-by-minute balancing is managed using "bid/offer acceptances" within the BM by National Grid. Additionally, National Grid 'calls-off' other balancing services including Standing Reserve, Fast Reserve and other services for balancing over various timescales.

Predicted variations and peaks in demand, and problems at large power stations, are managed mainly using the flexibility of coal power stations, with additional contribution from oil, hydro, pumped storage and the lower efficiency gas power stations. In general, and with the exception of hydro, the more flexibly a power station operates, the less efficiently it generates, and the more polluting emissions it produces.

Electricity is freely traded in the UK via various mechanisms including power exchanges, for example, APX, forward and futures markets, through brokers and bilaterally. These mechanisms offer various different ways of trading electricity at the wholesale level. For example, they enable electricity to be traded on the spot markets for imminent periods (but prior to gate closure), or on the forward market for future periods. They also enable electricity to be traded for specific half hours or for much longer durations. It is through these mechanisms that generators sell their output to suppliers, who then sell the electricity to consumers. Traders can also buy and sell electricity at the wholesale level.

Commercial incentives exist to encourage market participants to balance electricity through the above trading mechanisms. In the event that supply and demand do not match, National Grid, as the system operator, buys or sells electricity and 'calls off' reserve services to ensure that the system is balanced in real time.

National Grid also purchases frequency response services which reward large-scale consumers who agree to provide a limited form of frequency response. Two of these (Frequency Response by Demand Management, FRDM, and Firm Frequency Response, FFR), involve the placing of certain large loads behind frequency-sensitive relays which isolate the load when the frequency falls below a pre-set level, often 49.7 Hz.

Schemes such as this are largely limited to large scale consumers and do not take into account the real time needs of any processes that the large scale consumers are running. Therefore only consumers able to make long term forward commitments to National Grid which will not be overridden by the short term needs of their own processes can provide these services.

According to a first aspect of the present invention there is provided an aggregated management system for managing a commodity comprising:
  a plurality of commodity resources;
  an availability calculation means;
  a resource aggregator, wherein each resource, depending on availability data from the availability calculation means, is aggregated to represent at least one aggregated resource;
  a resource controller, wherein each commodity resource, depending on availability, is selectively operated by the resource controller in response to a resource instruction; and
  an interface to provide information regarding the at least one aggregated resource and receive resource instructions regarding the at least one aggregated resource for the resource controller.

In the context of the present invention, "commodity" refers to a product produced for exchange.

Preferably, the commodity resources are located physically remote from the resource aggregator, resource controller and interface.

Preferably, each of the plurality of commodity resources comprises an outstation.

Preferably, the outstation comprises the availability calculation means

Alternatively, the availability calculations means is located centrally and the outstation supplies live data to the availability calculation means.

Preferably, the availability calculation means monitors availability of the resource by means of a state machine, providing two binary levels of availability.

Alternatively or further preferably, the availability calculation means monitors availability by algorithm calculations, the algorithm calculations providing more than two levels of availability.

Preferably, the system further comprises an aggregated demand forecaster, wherein data from the commodity resources is used to predict resource usage and is then combined to provide an aggregated demand forecast for the at least one aggregated resource.

Preferably, the aggregated demand forecaster re-forecasts demand when a resource is altered from its predicted usage.

Alternatively or further preferably, the aggregated demand forecaster re-forecasts demand dependent on third party information which affects a resource.

Preferably, the resource controller selectively operates the resources and receives data from the resources by means of a virtual private network to the relevant resource outstation.

Preferably, the commodity is an energy commodity transferable via a network interconnecting a multiplicity of said commodity resources.

Preferably, the commodity is electricity.

Preferably, at least one of the plurality of commodity resources is an electricity generator.

Preferably, at least one of the plurality of commodity resources is an electricity load.

Preferably, the electricity load is a variable speed drive (VSD) according to the fourth aspect of the present invention.

Preferably, the electricity load is an energy store and is enabled, when required by the resource controller, to act as an electricity generator through release of the stored energy.

Preferably, the energy store is a battery charging system.

Preferably, the electricity load has one or more alternative power sources other than the electricity commodity and is enabled to load the, or at least one of the, alternative power sources when required by the resource controller, thereby reducing electricity load to the electricity commodity.

Preferably, one or more of the alternative power sources is a battery.

Preferably, the electricity load is a portable electronic device having a communication means, the resource controller enabled to communicate with the portable electronic device to control loading of the electricity commodity.

Alternatively, the commodity may be gas.

Preferably, at least one of the plurality of commodity resources is a gas compressor, which keeps mains gas pressure constant.

Preferably, at least one of the plurality of commodity resources is a gas load (consumer of gas).

According to a second aspect of the present invention there is provided a method of managing and aggregating a commodity comprising the steps of:

aggregating a plurality of commodity resources, depending on the resources availability calculating each resource's availability, to represent at least one aggregated resource;

controlling said commodity resources, wherein each resource, depending on availability, is controlled in response to a resource instruction;

communicating information regarding the at least one aggregated resource; and receiving resource instructions regarding the at least one aggregated resource and controlling said commodity resources accordingly.

Preferably, each resource's availability is calculated by means of a state machine, providing two binary levels of availability.

Alternatively or further preferably, each resources availability is calculated by algorithm calculations, the algorithm calculations providing more than two levels of availability.

Preferably, the method further comprises the step of forecasting aggregated demand, wherein availability data from the commodity resources is used to predict resource usage and is then combined to provide an aggregated demand forecast for the at least one aggregated resource.

Preferably, the method further comprises the step of re-forecasting aggregated demand when a resource is altered from its predicted usage.

Alternatively or further preferably, the step of re-forecasting aggregated demand is also performed dependent on third party information which affects a resource.

Preferably, the commodity is an energy commodity transferable via a network interconnecting a multiplicity of said commodity resources.

Preferably, the commodity is electricity.

Preferably, at least one of the plurality of commodity resources is an electricity generator.

Preferably, at least one of the plurality of commodity resources is an electricity load.

Preferably, the electricity load is a variable speed drive (VSD) according to the fourth aspect of the present invention.

Preferably, the electricity load is an energy store and enabling, when required by the resource controller, the energy store to act as an electricity generator through release of stored energy.

Preferably, the energy store is a battery charging system.

Preferably, the electricity load has one or more alternative power sources other than the electricity commodity and loading the, or at least one of the, alternative power sources, when required by the resource controller, thereby reducing electricity load to the electricity commodity.

Preferably, one or more of the alternative power sources is a battery.

Preferably, the electricity load is a portable electronic device having a communication means, the resource controller communicating with the portable electronic device to control loading of the electricity commodity.

Alternatively, the commodity may be gas.

Preferably, at least one of the plurality of commodity resources is a gas compressor, which keeps mains gas pressure constant.

Preferably, at least one of the plurality of commodity resources is a gas load (consumer of gas).

According to a third aspect of the present invention there is provided an aggregated load management system for managing a commodity comprising:

a plurality of commodity loads, each load comprising an availability calculation means;

a load aggregator, wherein the plurality of loads, depending on availability data from the availability calculation means, are aggregated to represent at least one aggregated load;

a load controller, wherein each load, depending on availability, is selectively operated by the load controller in response to a load instruction; and an interface to provide information regarding the at least one aggregated load and receive load instructions for the load controller.

According to a fourth aspect of the present invention there is provided a variable speed drive comprising a frequency compensation means and an availability calculation means, wherein the frequency compensation means varies the speed of the drive dependent on the frequency of the electricity supply and the availability of the drive as calculated by the availability calculation means.

Preferably, the frequency compensation means responds to a reduction in the frequency of the electricity supply by reducing the speed of the variable speed drive, if the availability calculation means confirms availability.

Preferably, the frequency compensation means reduces the speed of the variable speed drive to a greater extent than the reduction in the frequency of the electricity supply, providing an enhanced balancing effect.

Preferably, the frequency compensation means responds to an increase in the frequency of the electricity supply by increasing the speed of the variable speed drive, if the availability calculation means confirms availability.

Preferably, the frequency compensation means increases the speed of the variable speed drive to a greater extent than the increase in the frequency of the electricity supply, providing an enhanced balancing effect.

According to a fifth aspect of the present invention there is provided an electronic device comprising:

a mains electricity power supply means;

one or more alternative power supply means;

communication means; and processing means, wherein, upon receipt of instructions from an aggregated management system over the communication means, the processing means is enabled to change the power supply to the electronic device from the mains electricity power supply means to one or more of the alternative power supply means or to the mains electricity power supply means from one or more of the alternative power supply means, as required, depending on whether the electronic device is required to act as a load or not as directed by the aggregated management system.

Preferably, one or more of the alternative power sources is a battery.

Preferably, the device is one of the following: a portable computer; or a personal digital assistant.

According to a sixth aspect of the present invention there is provided a method of controlling the power consumption of an electronic device having a mains electricity power supply means, one or more alternative power supply means, communication means and processing means comprising:

receiving instructions from an aggregated management system over the communication means;

processing the instructions to select an appropriate power supply means;

changing the power supply to the electronic device from the mains electricity power supply means to one or more of the alternative power supply means or to the mains electricity power supply means from one or more of the alternative power supply means, as required, depending on the selection of the appropriate power supply means, which depends on whether the electronic device is required to act as a load or not as directed by the aggregated management system.

Preferably, one or more of the alternative power sources is a battery.

Preferably, the device is one of the following: a portable computer; or a personal digital assistant.

According to a seventh aspect of the present invention there is provided a computer program product directly loadable into the internal memory of a digital computer comprising software code portions for performing the sixth aspect of the invention.

The invention will now be described, by way of example, with reference to the figures of the drawings in which:

FIGS. 2a, 2b and 2c show respectively availability data of three groups of aggregated loads, call data for those groups and forecast consumption for those groups;

FIG. 3 shows a tabular representation of the data in FIGS. 2a, 2b and 2c, as well as pricing information for that data;

FIGS. 4a, 4b and 4c show respectively availability data of three groups of aggregated loads after a call has been made, call data for those groups and forecast consumption for those groups; and FIG. 5 shows a tabular representation of the data in FIGS. 4a, 4b and 4c, as well as pricing information for that data.

Figure 1:
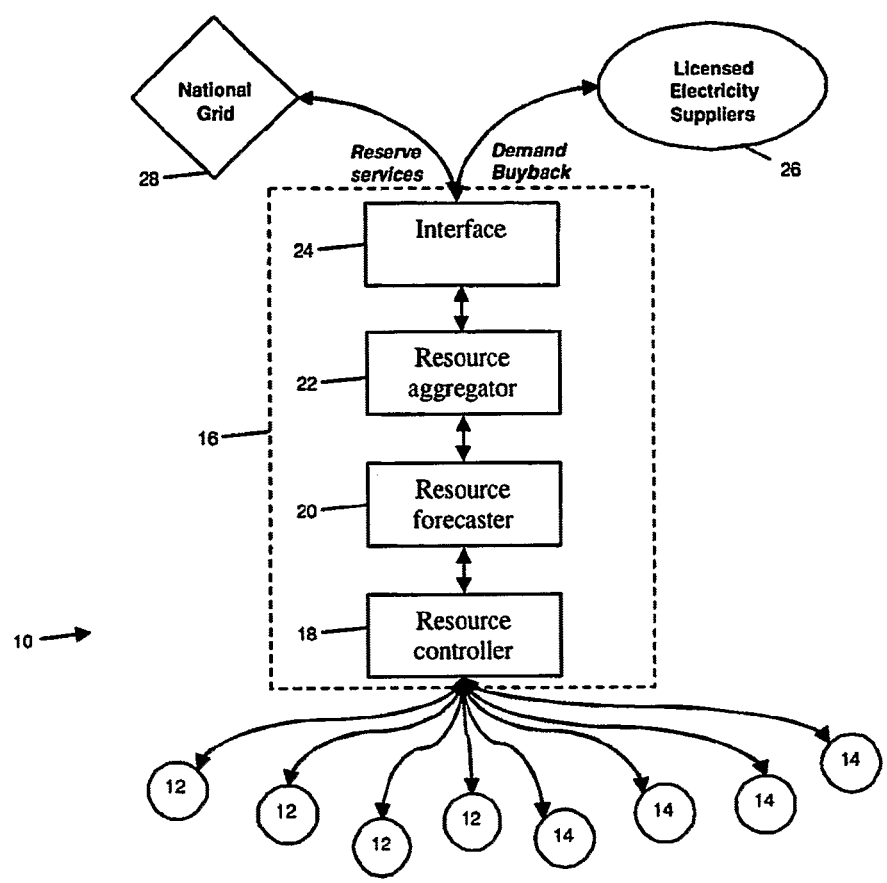
FIG. 1 shows a flow diagram of an aggregated management system for electricity.

Referring to FIG. 1, an aggregated management system 10 is shown, which in this case is an aggregated electricity management system. A number of small scale generators 12 are shown, as well as a number of small scale loads 14. The loads 14 and generators 12 are resources connected to the electricity network. Furthermore, a resource could be an energy storage system, such as a fuel cell arrangement comprising an electrolyser and hydrogen store. This type of resource can operate as both a load (storing) and a generator (giving back). Certain electricity loads can also act as energy stores, for example, battery charging systems for mechanical handling equipment could interrupt battery charging for short periods, and could additionally use some of the stored charge to return electricity to the electricity system. Devices with both portable (e.g. battery) and mains power supplies, such as laptop computers and personal electronic devices, could be instructed to run for short periods on battery power while mains connected, temporarily reducing consumption from the electricity system. Electronic devices with internet or mobile telephone connection capability are particularly suitable as the means of communication is built into the device and can be accessed if a software tool is downloaded onto the device. Any electricity consuming device can be converted into an electricity storing device by adding a battery or other energy storage means, so that such a device could act as a generator 12 and/or load 14.

The generators 12 are typically standby diesel generators, which can only generate electricity which is usually too small to be considered for contributing to the balancing required for the electricity network. Other types of electricity generators can also be used, such as hydro plants and combined heat and power plants. Where additional power is required to help the electricity system, these generators can be brought online as an aggregated generator of electricity.

The loads 14 can be any processes or equipment, such as water pumping, refrigeration, air conditioning, product movement, stock preparation and any other process. These types of loads are usually not constantly running and many include a control system which attempts to keep a certain variable within pre-defined parameters. As such, if the loads are able to be reduced or switched, then the load on the electricity system can be reduced.

Each generator 12 and load 14 comprises an outstation (not shown). The outstation provides monitoring and control of the resource at the remote location and comprises an availability calculation means. So, for example, where a load 14 is a refrigeration unit, the outstation can monitor whether the refrigeration unit is on and the temperature the refrigeration unit is controlling. From this it can determine when the refrigeration unit is likely to be available as a load on the system. A forecast of availability, taking into consideration the variation of the temperature the refrigeration unit is controlling, can then be calculated. It is important to note that although the forecast of availability may be a binary on/off value, it may also have a number of other levels or be an analogue value. So, it may be possible to provide limited load or generation to the aggregator depending on the circumstances of the resource.

The outstations are able to communicate with a server 16. The communication can take place by any suitable means, such as direct connection via Ethernet cables, an internet connection, which could be over a virtual private network (VPN) protocol or any other suitable means. Preferably, the outstations are equipped with dial-up modems and "always on" internet connections, such as ADSL lines. The outstations are enabled to attempt communication by a number of means should the most preferred connection not be available. It is also preferred that the outstation communicates with the server 16 over a VPN to provide a high level of security.

The server 16 comprises a resource controller 18, a resource forecaster 20, a resource aggregator 22 and an interface 24.

The resource controller 18 is enabled, via the communication channel with the outstation, to selectively operate the generators 12 and loads 14 dependent on instructions received via the interface 24.

The resource forecaster 20 receives availability information from each outstation and calculates when the generator 12 or load 14 can be utilised by the system 10. It is also possible for each outstation to comprise a resource forecaster such that future availability is calculated at the resource. In either case, the resource forecaster accesses a set of calculations which are unique to each resource in order to calculate both the resource availability and the forecast consumption (if a load) or production (if a generator or similar) of the resource. The resource forecaster uses process information such as analogue and digital information read at each resource by the relevant outstation in each calculation. Each calculation is repeated on a regular cycle, or when triggered by an external event.

The resource aggregator 22 combines the availability information from the resource forecaster 20, or from each resource forecaster from each outstation, into an aggregated availability of generators and an aggregated availability of loads. As such, the individual availabilities of each generator and each load are combined to present an aggregated generator and an aggregated load. In some instances, it may be desirable to combine certain resources dependent on either their type, ownership or other classification. For example, all the refrigeration units for a particular supermarket company, across all the company's stores, could be aggregated as a single aggregated load.

An interface 16 provides access to the aggregated resources managed by the system 10. In this example, Licensed Electricity Suppliers 26 and National Grid 28 are able to view aggregated resources on their computer terminals by accessing the interface 16.

The system 10 provides an end-to-end control tool for matching electricity supply and demand in real time. At one end are the relatively small number of electricity traders working for Licensed Electricity Suppliers 26, responsible for forward purchasing sufficient electricity for the consumption they expect their customers to use, or National Grid's own operational control staff. At the other end are the large number of industrial and commercial customers of various sizes who need electricity to power their normal business activities, or owners of electricity generators or electricity storage equipment which may be too small to access by the means employed for large power stations. The system 10 allows high speed, aggregated load management (switching off electricity consuming equipment for short periods) or generation during periods of high stress on the electricity system.

Load management means short term reduction or cessation of electricity consumption by some process or equipment in order to reduce the burden on the overall electricity system during a period of system stress. The processes or equipment whose consumption is being curtailed will be suitable parts of the normal business activities of industrial and commercial electricity consumers, such as water pumping, refrigeration, air conditioning, product movement, stock preparation and any other process. The value to Licensed Electricity Suppliers is the ability to opt out of buying short term high priced electricity when the market is short (i.e. under stress), or indeed to create a surplus of premium electricity to sell during such a period. The value to National Grid is the ability to access load management for reserve purposes at lower cost than other reserve options. Furthermore, the system 10 allows the creation of a virtual large volume resource from a large number of relatively small resources.

One resource, which would be particularly beneficial to the balancing of the electricity system is a variable speed drive (VSD), also known as a variable frequency drive. In many motors or drives, the frequency of the electricity supply directly affects the speed at which they operate. But with a VSD, the speed of the drive is independent of the frequency of the electricity input. A VSD with a frequency sensitive mode which reacts to the frequency of the electricity supply provides additional supply balancing.

That is, when the frequency of the electricity supply falls relative to nominal frequency, the frequency of the drive (and hence the rotation rate of the motor) would be set to fall to a greater or lesser extent, thus reducing the load on the national electricity system and thereby tending to correct the frequency excursion. If the frequency of the electricity supply rises, the VSD would respond in the opposite manner.

The ability of a drive to respond to frequency would be continuously adjusted on the basis of the need of that VSD to carry out its function at its "nominal" rate at that time. For example, sewage pumps operating with a relatively full well would exhibit little or no response to a fall in frequency, but when the well was close to empty, the response would be greater. Air conditioning fans would likewise exhibit more response when the controlled variable (say temperature) was well within normal operational limits, and less when the variable was close to limits. The response could be skewed to reflect the different-sided limits, e.g., while the sewage pumps were unable to respond to a fall in frequency, they may be able to respond to a rise, and vice versa.

An outstation attached to a VSD could monitor the available frequency response and report on it, or to set particular loads into frequency sensitive mode when required by the resource controller. These are optional additions. However, the ability of the frequency-sensitive process to automatically "opt out" of frequency sensitive operation would be a significant factor in its acceptability by operators of VSDs.

Variable speed electricity generators, such as wind turbines using doubly fed induction generators or inverter drives, could also provide frequency sensitive operation controlled by the system 10.

Referring now to FIGS. 2a, 2b, 2c, 3, 4a, 4b, 4c and 5, an example of the typical information presented to electricity traders of a Licensed Electricity Supplier or National Grid by the interface 24.

Three groups depicted in different colours (Group 1—dark grey, Group 2—light grey and Group 3—white) represent aggregated load which is available to electricity traders in this example. FIG. 2a shows the situation when all 3 groups are available to traders. FIG. 2b shows "calls" by traders for load to be taken off the system, which obviously shows no calls. FIG. 2C shows the forecast consumption of each group of the aggregated loads.

A trader or operator makes a call by selecting which groups of loads should be shut down during a particular time period, which, in this example, are broken down in to half-hour slots. In this case, the trader or operator selects Groups 1 and 3 for one hour, approximately 90 minutes ahead of the time (current time shown at the left most point of the x-axis). The system then shows the new forecast consumption (FIG. 4c) and forecast load management availability (FIG. 4a). It can be seen that, as Groups 1 and 3 require to "catch up" consumption after the call by the trader or operator, they are no longer available for load management for a few hours thereafter. Group 2 remains available throughout as it has not been utilised by the trader.

FIG. 3 shows the same information as FIGS. 2a, 2b and 2c in tabular form but also including a price per MegaWatt Hour for each group and each time slot. FIG. 5 shows the same information as FIGS. 4a, 4b and 4c in tabular form but again also including a price per MegaWatt Hour for each group and each time slot.

In response to the trader or operator actions, the system 10 will both issue and control the loads 14 via the resource controller 18, where the loads 14 are part of groups 1 and 3, and at the same time update the forecast consumption and availability via the resource forecaster 20.

The present invention benefits both traders (or operators) and consumers by reducing both the cost of production of electricity and the price of electricity to the consumer.

The concepts of load management, electricity system balancing and aggregation are not necessarily new as individual concepts. However, the present invention introduces a number of advantageous benefits as set out below.

Process-led load management, that is, aggregation and management of loads dependent on their availability, which is determined according to the loads current operating conditions. In addition, the future needs of the load are also calculated and taken into consideration when forecasting future availability. Electricity consumption at any site will not be curtailed when parameters measured by the outstations indicate that loads should not be curtailed, for example, air cooling equipment would not be considered available for load management when the controlled air temperature was in excess of, or was expected to exceed in the near future, a limit agreed in advance. However, during periods when the processes do possess flexibility (for example when the controlled temperature was within agreed limits) this flexibility is made available for electricity balancing. Therefore, the core business processes of electricity consumers are protected while the consumers earn revenue by providing balancing services. This enables a much wider participation of consumers in system balancing.

"Firm-by-prediction" electricity system balancing. Industry practice worldwide has tended to be for "firm" services (high commitment, high value) or "non-firm" services (no commitment, limited value). For many consumers these two forms translate as "impractical" on one hand and "not worthwhile" on the other, and load management has grown little as a system balancing tool as a result. Continuously updated load management availability makes services which would otherwise be "non-firm" potentially as valuable for system balancing as "firm" services. "Firm-by-prediction" electricity balancing services are therefore far more atteactive to National Grid and to Licensed Electricity Suppliers.

Overall, the present invention enables cheaper and less polluting electricity system balancing, reduces the need to invest in transmission infrastructure, creates more capacity to absorb renewable generation, and mitigates against high energy costs, and provides electricity consumers and owners of small generators with an additional revenue stream.

Aggregated management through the system 10 for large scale electricity system balancing saves at least 130 tonnes of carbon dioxide per gigawatt-hour of electricity consumed, plus an additional 300 tonnes of carbon dioxide for each megawatt of load management capacity made available per year, providing a significant benefit to the environment. This benefit will vary from country to country, but will be of this order in any country where fossil fuels are a significant component of electricity generation. The savings arise by reducing the need to operate the lowest efficiency fossil fuelled generators during peaks in demand, reduction in costly starts, stops and part load operation of large power stations, from better electricity system balancing and by making the electricity system more able to absorb variable renewable generation.

In addition, the application of balancing supply and demand in electricity through process-led aggregation can also be applied to the supply and demand of gas with the exception of the carbon dioxide benefit and the replacement of frequency responsive operation with pressure responsive operation. However, the supply and demand of gas managed by the present invention enhances the safety of the gas network. A loss of pressure in the national gas system can cause deaths, so the ability to curtail supply to controllable consumers is a safety benefit as it provides the gas transmission system operator with another means of ensuring that pressure in the national gas system does not fall below critical safety levels.

In fact, any energy commodity which is part of a continuous infrastructure-based supply chain can be managed using the present invention. The more time-critical the supply and demand, the greater the benefit that the present invention provides. In particular, commodities transferable via a network and, preferably, a near instantaneous network, benefit most from the present invention.

On the other hand, energy commodities which are delivered using bulk transport vehicles (small scale oil, all solid fuels, etc) might not find the present invention so useful, as there is a less time critical "balancing" requirement.

However, where a bulk energy commodity has a natural interaction with a time critical commodity, the present invention would be particularly useful. The most obvious example would be the timing of the charging of, for example, hydrogen tanks or batteries for road transport—charging of such energy stores should avoid periods of electricity system stress. It should be noted that a commercial energy storage plant could be connected to the electricity (or gas) system and absorb energy during times of surplus, giving it back during times of stress. Both of these already exist at large scale in both electricity and gas systems but they do not exist at small scales due to the lack of a process-led aggregation system, such as the present invention.

Improvements and modifications may be incorporated in the foregoing without departing from the scope of the present invention.

The invention claimed is:

1. An aggregated management system for end user electricity consumer electricity loads in an electrical power system comprising:
   a plurality of end user electricity consumer electricity loads;
   an availability calculator for determining an availability of each end user electricity consumer electricity load for short term load curtailment according to a load's current operating conditions by monitoring process or equipment variables of the end user electricity consumer electricity load;
   a resource aggregator, wherein a plurality of end user electricity consumer electricity loads, depending on availability data from the availability calculator, are aggregated according to a common type and/or ownership of end user electricity consumer electricity load to represent at least one aggregated load, the or each aggregated load representing a potential increase or decrease in electricity demand to the electrical power system;
   a resource controller, wherein electricity consumption of each end user electricity consumer electricity load, depending on the determined availability for short term load curtailment, is selectively changed by the resource controller in response to a resource instruction sent to the at least one aggregated load;
   an interface to provide availability data of the at least one aggregated load from the resource aggregator and receive resource instructions regarding the at least one aggregated load for the resource controller; and an aggregated demand forecaster using data from the availability calculator to predict each electricity load's usage and to provide an aggregated demand forecast for the at least one aggregated load.

2. A system as claimed in claim 1, wherein the availability calculator monitors availability of the end user electricity consumer load by means of a state machine, providing two binary levels of availability.

3. A system as claimed in claim 1, wherein the availability calculator monitors availability by algorithm calculations, the algorithm calculations providing more than two levels of availability.

4. A system as claimed in claim 1, wherein the aggregated demand forecaster re-forecasts demand when an electricity load is altered from its predicted usage.

5. A system as claimed in claim 1, wherein at least one of the end user electricity consumer electricity loads is a variable speed drive (VSD) comprising a frequency compensator and an availability calculator, wherein the frequency compensator varies speed of a drive dependent on frequency of electricity supply and the availability of the drive as calculated by the availability calculator.

6. A system as claimed in claim 5, wherein the frequency compensator responds to a reduction or increase in the frequency of the electricity supply by reducing or increasing the speed of the variable speed drive respectively, if the availability calculator confirms availability.

7. A system as claimed in claim 6, wherein the frequency compensator reduces or increases the speed of the variable speed drive to a greater extent than the reduction or increase in the frequency of the electricity supply respectively, providing an enhanced balancing effect.

8. A system as claimed in claim 1, wherein at least one of the end user electricity consumer electricity loads is an energy store and is enabled, when required by the resource controller, to act as an electricity generator through release of the stored energy.

9. A system as claimed in claim 1, wherein at least one of the end user electricity consumer electricity loads has one or more alternative power sources other than the electrical power system and is enabled to load the, or at least one of the, alternative power sources when required by the resource controller, thereby reducing electricity load to the electrical power system.

10. A system as claimed in claim 9, wherein the end user electricity consumer electricity load is a portable electronic device having a communicator, the resource controller enabled to communicate with the portable electronic device to control a device's power consumption.

11. A method of managing and aggregating end user electricity consumer electricity loads for an electrical power system comprising the steps of:
    aggregating a plurality of end user electricity consumer electricity loads, depending on an electricity loads' availability and according to a common type and/or ownership of end user electricity consumer electricity load;
    determining each end user electricity consumer electricity load's availability for short term load curtailment, according to a load's current operating conditions by monitoring process or equipment variables of the end user electricity consumer electricity loads, to represent at least one aggregated load;
    controlling said end user electricity consumer electricity loads, wherein an electricity consumption of each end user electricity consumer load, depending on the determined availability for short term load curtailment, is changed in response to a resource instruction sent to the at least one aggregated load;
    communicating availability data of the at least one aggregated load; and
    receiving resource instructions regarding the at least one aggregated load and controlling said end user electricity consumer electricity loads accordingly; and
    forecasting aggregated demand, using availability data from the end user electricity consumer electricity loads to predict load usage and to provide an aggregated demand forecast for the at least one aggregated load.

12. A method as claimed in claim 11 wherein each end user electricity consumer load's availability is calculated by means of a state machine, providing two binary levels of availability.

13. A method as claimed in claim 11, wherein each end user electricity consumer load's availability is calculated by algorithm calculations, the algorithm calculations providing more than two levels of availability.

14. A method as claimed in claim 10, further comprising a step of re-forecasting aggregated demand when an end user electricity consumer load is altered from its predicted usage.

* * * * *